United States Patent [19]

Behn et al.

[11] 4,422,406

[45] Dec. 27, 1983

[54] APPARATUS FOR MANUFACTURING METAL LAYERS AND GLOW POLYMER LAYERS WHICH ARE SUPERIMPOSED AND ARRANGED LATERALLY OFFSET RELATIVE TO ONE ANOTHER

[75] Inventors: Reinhard Behn; Kurt Kaufman, both of Munich, Fed. Rep. of Germany

[73] Assignee: Siemens Aktiengesellschaft, Berlin & Munich, Fed. Rep. of Germany

[21] Appl. No.: 279,998

[22] PCT Filed: Aug. 4, 1980

[86] PCT No.: PCT/DE80/00115

§ 371 Date: Jul. 7, 1981

§ 102(e) Date: Jul. 7, 1981

[87] PCT Pub. No.: WO82/00542

PCT Pub. Date: Feb. 18, 1982

[51] Int. Cl.³ ............................................. C23C 13/08
[52] U.S. Cl. .................................. 118/719; 118/720; 118/723; 118/729; 118/730; 118/733; 427/81
[58] Field of Search ...................... 118/50.1, 719, 720, 118/721, 723, 726, 729, 730, 733; 427/81

[56] References Cited

U.S. PATENT DOCUMENTS

| 2,432,950 | 12/1947 | Turner et al. | 118/730 X |
| 3,068,510 | 12/1962 | Coleman | 204/168 |
| 3,312,190 | 4/1967 | Bradshaw | 118/720 |
| 4,036,171 | 7/1977 | Ramet | 118/720 |
| 4,294,194 | 10/1981 | Behn et al. | 118/719 |

FOREIGN PATENT DOCUMENTS 2900724 7/1980 Fed. Rep. of Germany ...... 118/719

Primary Examiner—John D. Smith
Assistant Examiner—Bernard F. Plantz
Attorney, Agent, or Firm—Hill, Van Santen, Steadman & Simpson

[57] ABSTRACT

Apparatus for manufacturing metal layers and glow polymer layers which are superimposed and laterally offset relative to one another has two vacuum chambers which are separated from one another by air locks and has a cylinder with cavities in the surface thereof in which substrates for the layers are mounted on supports. Each cavity includes a displaceable diaphragm with a diaphragm aperture structure through which the layers are deposited. The cylinder, together with lock jaws, forms the air locks, so that the supports traverse both vacuum chambers. In a first vacuum chamber structures are provided for the manufacture of glow polymer layers and in a second vacuum chamber metallization structures are provided for the manufacture of the metal layers. In each cavity devices are provided for the displacement of the diaphragms between the glow polymer and metallization chambers. The cylinder is partially surrounded by at least one stationary curved ring and contains at least one rod which is spring loaded against the curved ring. The curved ring has profiled grooves and the rod traverses the grooves during rotation of the cylinder and acts as a cam follower to drive a device for laterally displacing the support, such displacement occurring as the particular cavity travels between the vacuum chambers.

11 Claims, 3 Drawing Figures

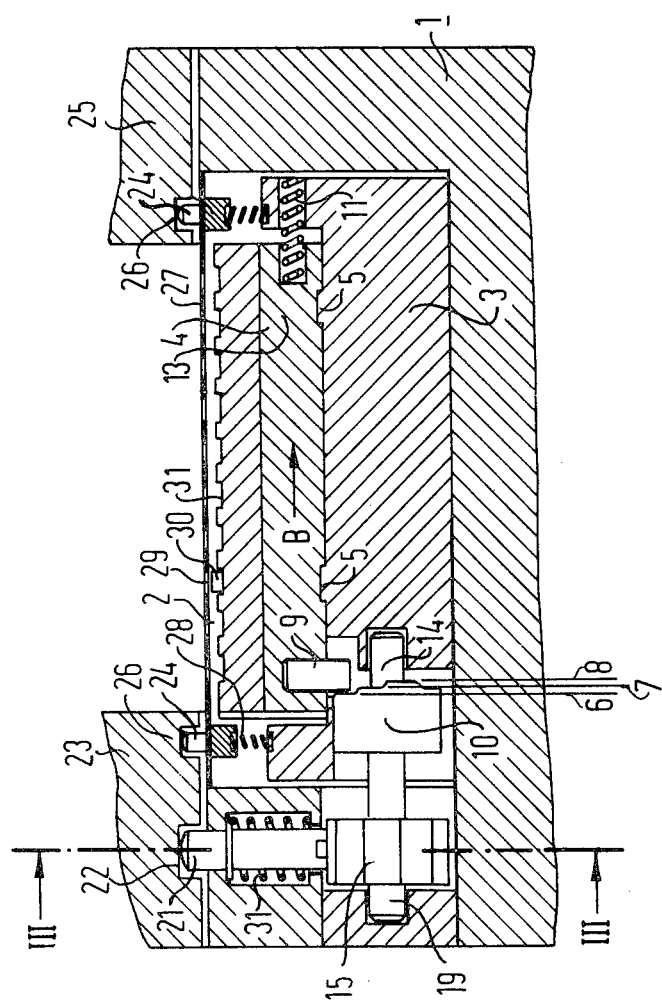
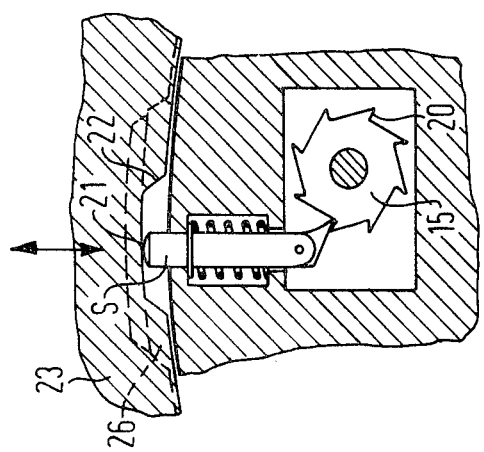
FIG 2
FIG 3

APPARATUS FOR MANUFACTURING METAL LAYERS AND GLOW POLYMER LAYERS WHICH ARE SUPERIMPOSED AND ARRANGED LATERALLY OFFSET RELATIVE TO ONE ANOTHER

BACKGROUND OF THE INVENTION

1. Field of the Invention

The present invention relates to an apparatus for manufacturing metal layers and glow polymer layers, which layers are superimposed on and arranged laterally offset with respect to one another on a substrate, which apparatus contains two vacuum chambers which are separated from one another by air locks, and which apparatus contains a cylinder having cavities in the surface thereof. The substrates are mounted on supports in the cavities and, for each cavity, a displaceable diaphragm is provided for selectively masking and providing coating of portions of the substrate. More specifically, the cylinder, together with lock jaws, forms air locks such that the supports traverse both vacuum chambers, in which, in the first chamber, an installation for the manufacture of glow polymer layers is located, and, in the second chamber, metallization installations are located for providing metal layers. Apparatus for displacing the diaphragms between the chamber for glow polymer layers and the chamber for metal layers is provided.

2. Description of the Prior Art

An apparatus of the type generally mentioned above has already been proposed in the art.

SUMMARY OF THE INVENTION

The object of the present invention is to provide that the diaphragms are brought into defined positions in relation to the substrates to be coated, in a simple manner, and that these positions are reproducible with a high degree of accuracy.

In the case of an apparatus of the type generally set forth above, the above object is achieved in that the cylinder is partially surrounded by at least one stationary curved ring, that the cylinder contains at least one impacting rod or pin which is pressed by a spring against the curved ring, that the curved ring includes recesses, that the impacting rod traverses the recesses during rotation of the cylinder, that the impacting rod is in operative connection with a device for effecting lateral displacement of the support, and that the displacement between a glow polymerization section and a metallization section, respectively, is brought about by the recesses in the curved ring.

This apparatus is relatively simply constructed, since the parts of the displacement device, which determine the amount of the displacement and its direction, are connected with the support, such that the tolerances of the cylinder are not a factor. By way of the impacting rod or pin and a ratchet wheel, a single step is always advanced in a wide range of cylinder tolerances. Moreover, the supports can be removed from the cylinder, fitted independently of the cylinder and inserted again. The reproducibility of the reciprocal position of the diaphragm and substrate is not influenced by such action. The curved rings guarantee an accurate position of the cavities relative to one another and to the remaining portions of the apparatus, such that the portion of the circumference of the cylinder, which is necessary for the diaphragm displacement, which cannot be utilized for a coating, can be kept small.

In order to manufacture layer capacitors, in which metal layers of different polarity and intermediate dielectric layers of glow polymer are to be applied, it is advantageous that the substrates be displaced relative to the diaphragm in a direction which is parallel to none of the edges of the diaphragm aperture. An all-sided reciprocal insulation of the coatings of opposite poles thereby results. During the displacement of the substrate relative to the diaphragm, on the other hand, the superposed layer structure already applied cannot be permitted to be damaged. The diaphragm is therefore clearly raised above its surroundings in the region of the glow polymer layers. On the other hand, the glow polymer layer is to be limited by a diaphragm supported on the substrate in order that tailing branches of the insulation layer cannot reach the zone of the contacting of the coatings. In order to realize these requirements, the diaphragm, at least during the glow polymerization, must be supported on the substrate, or on the uppermost, already-applied layer, and, during the displacement of the substrate relative to the diaphragm, it must be raised from the substrate. This advantageously occurs, in an exemplary embodiment of the invention, which contains two curved rings, which are arranged in the region of the two end faces of the cylinder, in which at least one of the curved rings contains the cavities for controlling the impacting rod or pin, in which both curved rings contain additional cavities, in which the diaphragm is mechanically rigidly connected with two sliding rods or pins which are biased, by spring tension, against one curved ring, in each case, and, during rotation of the cylinder, traverse the additional cavities, and in which the additional cavities are so dimensioned that the diaphragm is raised prior to displacement of the support and again pressed against the substrate subsequent to the displacement of the support.

Through this division of movement into a simple up and down movement of the diaphragm and a displacement of the substrate, the course of movement and, hence, the apparatus, is simply designed and a high degree of accuracy is guaranteed.

The power transmission for displacement of the substrate support is advantageously provided in that the impacting rod or pin, in the region of the cavity, is pressed against a ratchet wheel with an axis which is at least approximately parallel to the cylinder axis, and the ratchet wheel is thereby advanced by one ratchet tooth, that a cam disc is mechanically rigidly connected with the ratchet wheel, that one end face of cam disc exhibits a profile which is sensed by a sensing pin of the support which immediately effects the desired displacement of the support. The cam disc is advantageously so designed that the curve on its end face for displacing the sensing pin forms surfaces which are at least approximately perpendicular to the movement direction of the spacing pin, which direction is established by mechanical guides. In this embodiment, the movement of the spacing pin is achieved by a minimum expenditure of force, and there is little stress of material, so that the apparatus can correspondingly be dimensioned to be lightweight.

BRIEF DESCRIPTION OF THE DRAWINGS

Other objects, features and advantages of the invention, its organization, construction and operation will be best understood from the following detailed description thereof, taken in conjunction with the accompanying drawings, on which:

FIG. 2 is a longitudinal sectional view of an apparatus constructed in accordance with the present invention; and FIG. 3 is a sectional view of the apparatus of FIG. 2 taken generally along the parting line III—III.

DESCRIPTION OF THE PREFERRED EMBODIMENTS

Figure 1:
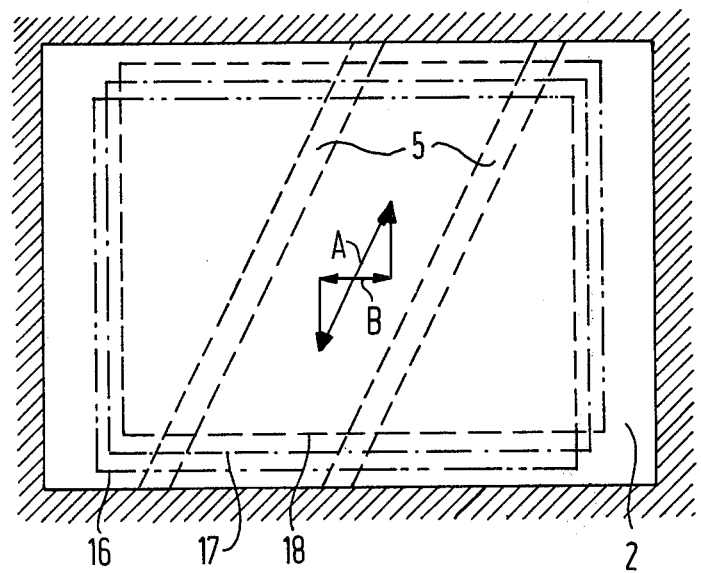
FIG. 1 is a schematic plan view of an apparatus constructed in accordance with the present invention, shown beneath the diaphragm which is stationary in the lateral direction.

Referring to the drawings, a cylinder 1 contains cavities 2 in which inserts 3 are housed. Each of the inserts 3 constitutes a support mounting means for slidably mounting a respective support 4 for carrying a substrate. A displacement of the support 4 can occur in the direction of an arrow A. The arrow direction A is established by cam rails 5 on the insert 3 and corresponding grooves in the support 4. The position of the support 4 is determined by way of a guide pin 9 through a cam disc 10 by rotation of the cam disc 10 about its axis. The guide pin 9 is placed against the profiled surface 6—8 of the cam disc 10 in a specified sequence and is urged thereagainst by a biasing spring 11. The spring 11 is supported in a bore of the insert 3. The positions 16—18 of the support 4 (FIG. 1) corresponds to respective surface portions 6—8 of the cam disc 10 (FIG. 2).

The cam disc 10 is frictionally connected with a ratchet wheel 15; for example, it is pressed on a common shaft 19.

The ratchet wheel 15 is advanced by way of an impacting rod pin 21 by a ratchet 20, respectively, when the impacting rod 21 traverses a cavity 22 of a stationary curved ring 23 (FIG. 3).

The curved ring 23 and a curved ring 25 surround the cylinder 1 in the region of the two end faces. The curved ring 23 contains cavities 22 disposed on a common circumferential circle and the cavity 26 disposed on another circumferential circle. During rotation of the cylinder 1, the cavities 22 are traversed by the impacting rods 21, whereas the cavities 26 are traversed by sliding pins 24 which are mechanically rigidly connected with a diaphragm 27 which is mobile in the radial direction relative to the cylinder 1. The cavities 26 are arranged relative to the cavities 22 such that the sliding pins 24, before the impacting rod 21 slides into the corresponding cavities, and after the rod 21 is again urged out of the cavities. The springs 28 urge the sliding pins against the curved rings 23 and 25, respectively. The curved ring 25 likewise exhibits cavities 26 which are traversed by sliding pins 24 on the corresponding diaphragm edge.

The diaphragm apertures 29 are disposed above the substrate 30 which are arranged in corresponding recesses 31 of the support 4.

The support 4 is moved through the rotation of the cam disc 10 in the direction A. The surfaces 6—8 of the cam disc 10 correspond to the component movement in the direction B which corresponds to the direction of the shaft 19. In order to allow the movement in direction A to run off without particular frictional forces, the cam disc 10 has surfaces 14 which are approximately perpendicular to the movement direction A. The diaphragm apertures 29 are preferably rectangular. The movement direction A is not parallel to any edge of the diaphragm apertures 29.

The curved rings 23 and 25 simultaneously serve as a closure of the vacuum chamber in the direction of the cylinder axis and thus serve as air locks. Therefore, in the illustrated example, the impacting rod 21 is installed not in the insert 3, but directly in the cylinder 1. In this manner, the high accuracy of the cylinder circumference can be exploited as an air lock and nevertheless an additional space requirement for the control of the impacting rod 21 can be avoided, which would not be possible in the case of the arrangement of the impacting rod in the insert 3, since the insert 3 requires installation tolerances, so that the surfaces formed by the insert, as part of an air lock, would not lead to a uniform, high vacuum.

Although the invention has been described by reference to particular illustrative embodiments thereof, many changes and modifications of the invention may become apparent to those skilled in the art without departing from the spirit and scope thereof. It is therefore intended to include within the patent warranted hereon all such changes and modifications as may reasonably and properly be included within the scope of these contributions to the art.

We claim:

1. In apparatus for manufacturing metal layers and glow polymer layers which are superposed on and arranged laterally offset of one another on a substrate, in which a rotatable cylinder and lock jaws form air locks between first and second vacuum chambers which respectively contain a glow polymer layer deposition structure and a metal layer deposition structure, in which a plurality of cavities are provided about the periphery of the cylinder for supporting respective substrates and carrying the same through the vacuum chambers, and in which each cavity has a displaceable apertured diaphragm at the surface of the cylinder, as a mask for the selective application of the glow polymer and metal layers, the improvement in combination therewith comprising:

for each cavity
a support in the cavity for supporting a substrate;
support mounting means in the cavity mounting said support for movement in a direction which includes a direction component which is parallel to the axis of rotation of the cylinder;
indexing means including an axially movable pin biased outwardly and mounted in and extending outwardly of the cylinder, and an indexing drive coupled between said pin and said support and operable to move said support on said support mounting means to a respective predetermined position upon each inward movement of said pin; and for all of the cavities
pin control means mounted adjacent and stationary with respect to the cylinder and including camming means engaging the pin and defining and effecting inward and outward movements of said pin at predetermined rotational positions of the cylinder.

2. The improved apparatus of claim 1, wherein:
said support and said support mounting means, one includes cam rails and the other includes grooves slidingly receiving said cam rails.

3. The improved apparatus of claim 2, wherein:

said cam rails and said grooves extend obliquely to the direction of rotation of the cylinder.

4. The improved apparatus of claim 2, and further comprising:

bias means between said support and said support mounting means urging said support toward said indexing drive; and a cam follower in said support engaging said indexing drive.

5. The improved apparatus of claim 4, wherein said indexing drive comprises:

a pawl carried by said axially movable pin;

a rotatable ratchet engaged and rotated by said pawl upon each inward movement of said axially movable pin; and a rotatable wheel connected to and rotated by said ratchet, said wheel including a cam surface engaging said cam follower and defining said predetermined positions of said support.

6. The improved apparatus of claim 1, wherein said pin control means comprises:

an arcuate member at least partially surrounding the cylinder adjacent the cavities and including a profiled groove constituting said camming means and receiving and engaging said pin therein.

7. The improved apparatus of claim 1, and further comprising:

a pair of elements connected to and biased to urge the diaphragm outwardly of the cylinder; and a pair of stationarily mounted shaped cams operable to contact said elements, respectively, and to move said elements and the diaphragm towards and away from the substrate in accordance with a predetermined schedule.

8. In an apparatus for manufacturing metal layers and glow polymer layers which are superposed on and arranged laterally offset of one another on a substrate, in which a rotatable cylinder and lock jaws form air locks between first and second vacuum chambers which respectively contain a glow polymer layer deposition structure and a metal layer deposition structure, in which a plurality of cavities are provided about the periphery of the cylinder for supporting respective substrates and carrying the same through the vacuum chambers, and in which each cavity has a displaceable apertured diaphragm at the surface of the cylinder as a mask for the selective application of the glow polymer and metal layers, the improvement in combination therewith comprising:

for each cavity a support in the cavity for supporting a substrate;

support mounting means in the cavity mounting said support for movement in a direction which includes a direction component which is parallel to the axis of rotation of the cylinder;

indexing means including an axially movable pin biased outwardly and mounted in and extending outwardly of the cylinder, and an indexing drive coupled between said pin and said support and operable to move said support on said support mounting means to a respective predetermined position upon each inward movement of said pin;

bias means between said support and said support mounting means urging said support towards said indexing drive;

a cam follower in said support engaging said indexing drive;

a pair of elements connected to and biased to urge the diaphragm outwardly of the cylinder; and a pair of stationarily mounted shaped cams operable to contact said elements, respectively, and move said elements and the diaphragm towards and away from the substrate in accordance with a predetermined schedule, of said support and said support mounting means, one includes cam rails and the other includes grooves slidingly receiving said cam rails, said cam rails and said grooves extending obliquely to the direction of rotation of the cylinder, said indexing drive comprising a pawl carried by said axially movable pin, a rotatable ratchet engaged and rotated by said pawl upon each inward movement of said axially movable pin, and a rotatable wheel connected to and rotated by said ratchet, said wheel including a cam surface engaging said cam follower and defining said predetermined positions of said support, and for all of the cavities pin control means mounted adjacent and stationary with respect to the cylinder and including camming means engaging the pin and defining and effecting inward and outward movements of said pin at predetermined rotational positions of the cylinder, said pin control means comprising an arcuate member at least partially surrounding the cylinder adjacent the cavities and including a profiled groove constituting said camming means and receiving and engaging said pin therein.

9. In an apparatus for manufacturing metal layers and glow polymer layers which are superposed on and arranged laterally offset of one another on a substrate, in which a rotatable cylinder and lock jaws form air locks between first and second vacuum chambers which respectively contain a glow polymer layer deposition structure and a metal layer deposition structure, in which a plurality of cavities are provided about the periphery of the cylinder for supporting respective substrates and carrying the same through the vacuum chambers, and in which each cavity has a displaceable apertured diagram at the surface of the cylinder as a mask for the selective application of the glow polymer and metal layers, the improvement in combination therewith comprising:

for each cavity a support in the cavity for supporting a substrate;

support mounting means in the cavity mounting said support for movement in a direction which includes a direction component which is parallel to the axis of rotation of the cylinder;

indexing means including an axially movable pin biased outwardly and mounted in and extending outwardly of the cylinder, and an indexing drive coupled between said pin and said support and operable to move said support on said support mounting means to a respective predetermined position upon each inward movement of said pin;

bias means between said support and said support mounting means urging said support towards said indexing drive;

a cam follower in said support engaging said indexing drive;

a pair of elements connected to and biased to urge the diaphragm outwardly of the cylinder; and a pair of stationarily mounted shaped cams operable to contact said elements, respectively, and move said elements and the diaphragm towards and away from the substrate in accordance with a predetermined schedule, of said support and said support mounting means, one includes cam rails and the other includes grooves slidingly receiving said cam rails, said indexing drive comprising a pawl carried by said axially movable pin, a rotatable ratchet engaged and rotated by said pawl upon each inward movement of said axially movable pin, and a rotatable wheel connected to and rotated by said ratchet, said wheel including a cam surface engaging said cam follower and defining said predetermined positions of said support; and for all of the cavities pin control means mounted adjacent and stationary with respect to the cylinder and including camming means engaging the pin and defining and effecting inward and outward movements of said pin at predetermined rotational positions of the cylinder, said pin control means comprising an arcuate member at least partially surrounding the cylinder adjacent the cavities and including a profiled groove constituting said camming means and receiving and engaging said pin therein.

10. In an apparatus for manufacturing metal layers and glow polymer players which are superposed on and arranged laterally offset of one another on a substrate, in which a rotatable cylinder and lock jaws form air locks between first and second vacuum chambers which respectively contain a glow polymer layer deposition structure and a metal layer deposition structure, in which at least one cavity is provided on the periphery of the cylinder for supporting a substrate and carrying the same through the vacuum chambers, and in which the cavity has a displaceable apertured diaphragm at the surface of the cylinder as a mask for the selective application of the glow polymer and metal layers, the improvement in combination therewith comprising:

a support in the cavity for supporting a substrate;

support mounting means in the cavity mounting said support for movement in a direction which includes a direction component which is parallel to the axis of rotation of the cylinder;

indexing means including an axially movable first pin biased outwardly and mounted in and extending outwardly of the cylinder, and an indexing drive coupled between said pin and said support and operable to move said support on said support mounting means to a respective predetermined position upon each inward movement of said pin;

a pair of second pins connected to opposite ends of the diaphragm and biased outwardly of the cylinder;

first and second arcuate members each at least partially surrounding the cylinder at respective opposite ends of the cavity, each of said arcuate members including a respective first groove having a bottom wall engaging a respective second pin and shaped to move said diaphragm, together with its bias, toward and away from the substrate in accordance with a first pattern; and a second shaped groove in said first member including a bottom wall engaging said first pin and shaped to move said first pin, together with its bias, inwardly and outwardly in accordance with a second pattern.

11. The improved apparatus of claim 10, wherein said first and second grooves include shaped bottom walls, with respect to each other, such that said first pin moves outwardly, then inwardly, between the outward and inward movements of said second pins.

* * * * *